(12) United States Patent
Sato et al.

(10) Patent No.: US 10,123,100 B2
(45) Date of Patent: Nov. 6, 2018

(54) OPTICAL NETWORK

(71) Applicant: JAPAN SCIENCE AND TECHNOLOGY AGENCY, Kawaguchi-shi, Saitama (JP)

(72) Inventors: Ken-ichi Sato, Nagoya (JP); Hiroshi Hasegawa, Nagoya (JP); Yojiro Mori, Nagoya (JP); Yuki Terada, Nagoya (JP)

(73) Assignee: JAPAN SCIENCE AND TECHNOLOGY AGENCY, Kawaguchi-shi (JP)

( * ) Notice: Subject to any disclaimer, the term of this patent is extended or adjusted under 35 U.S.C. 154(b) by 192 days.

(21) Appl. No.: 15/122,289

(22) PCT Filed: Feb. 12, 2015

(86) PCT No.: PCT/JP2015/053872
§ 371 (c)(1),
(2) Date: Aug. 29, 2016

(87) PCT Pub. No.: WO2015/129472
PCT Pub. Date: Sep. 3, 2015

(65) Prior Publication Data
US 2016/0373841 A1 Dec. 22, 2016

(30) Foreign Application Priority Data
Feb. 28, 2014 (JP) .................................. 2014-039190

(51) Int. Cl.
*H04B 10/08* (2006.01)
*H04B 17/00* (2015.01)
(Continued)

(52) U.S. Cl.
CPC ...... *H04Q 11/0062* (2013.01); *H04J 14/0212* (2013.01); *H04J 14/0213* (2013.01); *H04Q 11/00* (2013.01); *H04Q 11/0005* (2013.01)

(58) Field of Classification Search
CPC .... H04J 14/0212; H04J 14/0213; H04J 14/02; H04Q 11/00; H04B 10/10; H04B 10/20; H04B 10/27; H04B 10/572
(Continued)

(56) References Cited

U.S. PATENT DOCUMENTS 6,795,652 B2 * 9/2004 Milton ................ H04J 14/0206
398/50
7,509,048 B2 * 3/2009 Turpin ................. G02B 6/2861
398/83
(Continued)

FOREIGN PATENT DOCUMENTS

| JP | 2013-085010 A | 5/2013 |
| JP | 2013-085011 A | 5/2013 |
| JP | 2014-027562 A | 2/2014 |

OTHER PUBLICATIONS

Cao, X. et al. "Waveband Switching in Optical Networks". IEEE Communications Magazine, vol. 41, No. 4, pp. 105-112, 2003.
(Continued)

*Primary Examiner* — Ken N Vanderpuye
*Assistant Examiner* — Abbas H Alagheband
(74) *Attorney, Agent, or Firm* — Oliff PLC (57) ABSTRACT

An optical network transmits a wavelength division multiplexing optical signal from a transmission to a reception node via a reconfigurable optical add/drop multiplexer and/or path cross-connect apparatuses. When optical or optical super channels made of successive optical subcarriers input from input optical fibers are routed or switched to an output optical fiber in the multiplexer and/or apparatus passed through by a wavelength division multiplexing optical signal transmitted from the predetermined transmission node to the predetermined reception node, the adjacent channels output to the same output fiber in each input fiber is collectively demultiplexed without being demultiplexed for
(Continued)

the channels and is routed or switched to the output fiber. Channel routing paths and frequency arrangements are controlled such that the number of filtering times by a wavelength division filtering mechanism on one or both sides on the frequency axis of the channel becomes equal to or less than a predetermined value.

7 Claims, 9 Drawing Sheets

(51) Int. Cl.
    *H04Q 11/00* (2006.01)
    *H04J 14/02* (2006.01)
(58) Field of Classification Search
    USPC ........ 398/48, 23, 50, 79, 83, 51, 45, 76, 53, 398/115
    See application file for complete search history.

(56) References Cited

U.S. PATENT DOCUMENTS

| | | | | |
|---|---|---|---|---|
| 8,611,743 | B2* | 12/2013 | Ji | H04J 14/0212 398/45 |
| 8,964,581 | B2* | 2/2015 | Takara | H04B 10/0793 370/252 |
| 9,100,137 | B2* | 8/2015 | Vassilieva | H04J 14/0227 |
| 9,419,743 | B2* | 8/2016 | Barnard | H04B 10/572 |
| 9,485,050 | B2* | 11/2016 | Barnard | H04B 10/572 |
| 2004/0131308 | A1* | 7/2004 | Mao | H04J 14/0227 385/24 |
| 2004/0131309 | A1* | 7/2004 | Zhang | G02B 6/29362 385/24 |
| 2006/0093258 | A1* | 5/2006 | Terahara | H04Q 11/0005 385/18 |
| 2009/0041457 | A1* | 2/2009 | Maki | H04J 14/0204 398/45 |
| 2012/0020664 | A1* | 1/2012 | Sakurai | H04J 14/0212 398/50 |
| 2012/0201541 | A1* | 8/2012 | Patel | H04J 14/0212 398/58 |
| 2012/0213517 | A1* | 8/2012 | Ji | H04J 14/0212 398/48 |
| 2012/0213523 | A1* | 8/2012 | Ji | H04J 14/0212 398/83 |
| 2013/0004163 | A1* | 1/2013 | Aoki | H04B 10/506 398/34 |
| 2014/0029942 | A1* | 1/2014 | Sato | H04J 14/0204 398/48 |
| 2014/0029944 | A1* | 1/2014 | Sato | H04Q 11/0005 398/50 |
| 2014/0140692 | A1* | 5/2014 | Oda | H04B 10/5057 398/23 |
| 2014/0198812 | A1* | 7/2014 | Olsson | H04J 14/0202 370/542 |
| 2014/0270776 | A1* | 9/2014 | Jinno | H04J 14/0204 398/69 |
| 2014/0314415 | A1* | 10/2014 | Vassilieva | H04J 14/0227 398/76 |
| 2017/0346594 | A1* | 11/2017 | Vassilieva | H04J 14/0267 |

OTHER PUBLICATIONS

Oct. 2, 2017 Extended European Search Report issued in European Patent Application No. EP15754670.6.

Taniguchi, Yuki et al., "Coarse Granular Optical Routing Networks Utilizing Fine Granular Add/Drop," Journal of Optical Communications and Networking, vol. 5, No. 7, Jul. (2013), pp. 774-783.

Taniguchi, Yuki et al., "Dynamic Grouped Routing Optical Networks for Cost Effective and Agile Wavelength Services," Optical Fiber Communication Conference and Exposition and the National Fiber Optic Engineers Conference, Mar. 17, 2013, pp. 1-3.

Terada, Yuki et al., "Enhancement of Fiber Frequency Utilization by Employing Grouped Optical Path Routing," Optical Fiber Communications Conference and Exhibition, Mar. 9, 2014, pp. 1-3.

Mar. 17, 2015 Search Report issued in International Patent Application No. PCT/JP2015/053872.

\* cited by examiner

OPTICAL NETWORK

TECHNICAL FIELD

The present invention relates to a control system of an optical network capable of enhancing a frequency utilization efficiency of optical signals in an optical network transmitting wavelength division multiplexed lights.

BACKGROUND ART

An optical network is known that transmits wavelength division multiplexed (WDM) lights including multiple wavebands each consisting of multiplexed optical channels (wavelength channels) of a predetermined bit rate on the order of GHz to THz for each of multiple wavelengths respectively corresponding to multiple optical (wavelength) channels (wavelength channels or light paths) divided based on wavelength by, for example, 100 GHz in a predetermined communication wavelength band, from a predetermined optical node to a plurality of other optical nodes through respective multiple optical fibers in series or in parallel among optical nodes. In such an optical network, an optical path cross-connect apparatus making up each optical node routes optical channels on the basis of wavelengths making up wavelength division multiplexed optical signals transmitted through optical fibers by using the wavelengths as labels to be routed to desired routes (destinations) directly as optical signals through optical paths on the basis of wavelengths, thereby implementing large-capacity transmission with low power consumption.

Because a traffic amount is predicted to increase at an accelerated rate in the optical network due to the recent deployment of ADSL and FTTH and the deployment of services such as high-definition moving image distribution, it is desired to increase the available numbers of wavelength paths and optical fibers and to further increase the scale of optical path cross-connect apparatuses making up nodes in the optical network.

PRIOR ART DOCUMENT

Patent Document

Patent Document 1: Japanese Laid-Open Patent Publication No. 2014-027562

SUMMARY OF THE INVENTION

Problem to be Solved by the Invention

In this regard, for example, as shown in FIG. 3 of Patent Document 1, an optical path cross-connect apparatus is proposed that is made up of a plurality of optical couplers each branching waveband multiplexing signal lights input from a plurality of optical fibers, and a plurality of wavelength selective switches selecting and outputting an optical signal of a desired wavelength channel from the light branched by the optical couplers to an arbitrary route. However, the optical path cross-connect apparatus in this form has a disadvantage that when the number of branches of the optical couplers becomes large as the scale increases, an optical loss is increased, making a transmitted optical signal of a wavelength channel weak.

As shown in FIG. 13 of Patent Document 1, an optical path cross-connect apparatus is proposed that is made up of a plurality of input-side wavelength selective switches selecting and outputting optical signals of desired wavelengths from waveband multiplexed signals respectively input from a plurality of optical fibers to a desired element, and a plurality of output-side wavelength selective switches outputting optical signals of desired wavelengths output from the input-side wavelength selective switches to desired optical fibers. The optical path cross-connect apparatus in this form has wavelength selective elements used therein made up of 3D MEMS optical switches or LCOS optical switches each including a filter (diffraction grating) for selecting a single wavelength from a wavelength division multiplexed light, and the wavelength filtering characteristics of the filter exhibit comparatively gentle curves near a lower limit frequency and an upper limit frequency. If the frequency width of the wavelength filtering characteristics of the filter is broadened to sufficiently cover the frequency of the wavelength channel, an interval of wavelength channels on a frequency axis must be widened, which leads to a reduction in utilization efficiency of frequency, and, conversely, if it is attempted to maintain the utilization efficiency of frequency, a portion of an optical signal falls outside the wavelength filtering characteristics of the filter, resulting in deterioration in the optical signal because the wavelength range of the optical signal is lost at the portion going beyond the filtering characteristics of the filter. This optical signal deterioration problematically progresses in accordance with an increase in the number of times of wavelength selection for routing, i.e., the number of times of filtering, in the optical path cross-connect apparatus.

The present invention was conceived in view of the situations and it is therefore an object of the present invention to provide an optical network capable of enhancing a frequency utilization efficiency of optical signals at the time of transmission of a wavelength division multiplexed light.

Solution to Problem

As a result of various studies for achieving the object, the present inventors found that, although the optical signal deterioration occurs when a wavelength selective element selects a desired wavelength for routing in an optical path cross-connect apparatus and selects an optical signal of a desired wavelength for dropping an optical signal from the optical path cross-connect apparatus, a drop process is less frequent as compared to a routing process since an optical signal is subjected to the drop process only once after passing through some nodes. Considering that optical networks are increasingly introduced not only to backbone lines between cities but also to local networks in recent years, it is expected that the number of nodes dramatically increases and results in an increase in the frequency of undergoing a filtering process. In the course of studies for reducing the filtering process, the present inventors found that the number of times of filtering can be reduced without deteriorating a communication function by devising a control method of an optical network. In particular, first, if respective optical channels of multiple wavelengths adjacent on the frequency axis are routed together, only the optical channels located on the both ends on the wavelength axis are partially lost due to filtering out of the multiple optical channels, while the other optical channels located in a central portion are never affected by the filtering, and therefore, transmission as a waveband is advantageous. Second, the influence of the filtering process includes deterioration in optical signal due to a drop process using filtering in an adjacent optical channel and, therefore, it is advantageous to assign signals so as not to be adjacent to a wavelength channel subjected to the drop process as far as possible. The present invention was conceived based on such knowledge.

That is, a first aspect of the invention provides an optical network (a) transmitting a wavelength division multiplexed optical signal from a predetermined transmission node to a predetermined reception node via one or more reconfigurable optical add/drop multiplexer and/or optical path cross-connect apparatuses, wherein (b) when optical channels or optical super channels made up of successive optical subcarriers input from any of input optical fibers are routed or switched to one or more output optical fibers in at least one of the reconfigurable optical add/drop multiplexer and/or the optical path cross-connect apparatus passed through by wavelength division multiplexed optical signals transmitted from the predetermined transmission node to the predetermined reception node, a plurality of optical channels or optical super channels adjacent to each other on a frequency axis output to the same output optical fiber in each input optical fiber is collectively demultiplexed as a bundle without being demultiplexed for respective optical channels or optical super channels and is routed or switched to the output optical fiber.

A second aspect of the invention provides the optical network recited in the first aspect of the invention, wherein (c) when one of the optical channels or the optical super channels is routed or switched from the transmission node through a plurality of nodes to the reception node, and a plurality of optical channels or optical super channels adjacent to each other on the frequency axis including an optical channel output to the same output optical fiber in each input optical fiber or dropped at the reception node is collectively demultiplexed without being demultiplexed for respective optical channels or optical super channels and is routed or switched to the output optical fiber, filtering of an optical signal for dropping is permitted only for the optical channel or the optical super channel to be dropped at the reception node, and wherein (d) routing paths and frequency arrangements of the optical channel or the optical super channel as well as optical channels or optical super channels terminated at path-through nodes located on the way are controlled such that the number of times of filtering by a wavelength division filtering mechanism on one or both sides on the frequency axis of the optical channel or the optical super channel becomes equal to or less than a predetermined value.

A third aspect of the invention provides the optical network recited in the first or second aspect of the invention, wherein (e) a plurality of optical channels or optical super channels accommodated in a constant width on the frequency axis is collectively routed from the input optical fibers to the output optical fibers at the path-through node, wherein filtering of an optical signal is permitted for the optical signal terminated at the path-through node, and wherein one or more said constant widths are used in the optical network.

A fourth aspect of the invention provides the optical network recited in the third aspect of the invention, wherein (f) arrangements of plurality of frequency bands in said one or more constant widths used in the optical network are kept unique in the optical network.

A fifth aspect of the invention provides the optical network recited in the third or fourth aspect of the invention, wherein (g) in the case of static design in which the optical network is designed by giving a traffic demand, a route and a frequency arrangement of an optical channel or an optical super channel in the optical network are searched for and assigned such that the number of drop processes of adjacent optical channels at nodes is minimized or becomes equal to or less than a predetermined value with respect to the optical channel or the optical super channel accommodated in a bundle of optical channels or optical super channels having a constant width on the frequency axis, and wherein (h) in the case of dynamic design in which an optical channel or an optical super channel is accommodated in the optical network each time a demand occurs, a route or a frequency of a demanded optical channel is searched for and assigned such that the number of drop processes at a node is minimized or becomes equal to or less than a predetermined value with respect to the demanded optical channel or optical super channel as well as existing adjacent optical channels or optical super channels when a route or a frequency is assigned to a newly arriving demand.

A sixth aspect of the invention provides the optical network recited in any one of the first to fifth aspects of the invention, wherein (i) a plurality of optical channels or optical super channels is collectively routed as a bundle by a constant width on the frequency axis from input optical fibers to output optical fibers at a path-through node located on the way, and wherein the optical channels or the optical super channels are separately routed or switched in a frequency band in which the bundle is not set.

Advantageous Effects of the Invention

According to the optical network recited in the first aspect of the invention, when optical channels or optical super channels made up of successive optical subcarriers input from any of the input optical fibers are routed or switched to one or more output optical fibers in at least one of the reconfigurable optical add/drop multiplexer and/or the optical path cross-connect apparatus passed through by a wavelength division multiplexed optical signal transmitted from a predetermined transmission node to the predetermined reception node, a plurality of optical channels or optical super channels adjacent to each other on the frequency axis output to the same output optical fiber in each input optical fiber is collectively demultiplexed without being demultiplexed for respective optical channels or optical super channels and is routed or switched to the output optical fiber. As a result, since the number of times of filtering applied to the optical channels or the optical super channels is reduced and a loss due to the filtering is made smaller, the frequency utilization efficiency of optical signals is enhanced when the wavelength division multiplexing light is transmitted.

According to the optical network recited in the second aspect of the invention, when one of the optical channels or the optical super channels is routed or switched from the transmission node through a plurality of nodes to the reception node, and a plurality of optical channels or optical super channels adjacent to each other on the frequency axis including an optical channel output to the same output optical fiber in each input optical fiber or dropped at the reception node in the input optical fibers is collectively demultiplexed without being demultiplexed for respective optical channels or optical super channels and is routed or switched to the output optical fiber, the filtering of the optical signal for dropping is permitted only for the optical channel or the optical super channel to be dropped at the reception node, and the route and frequency arrangements of the optical channel or the optical super channel and optical channels or optical super channels terminated at the path-through nodes located on the way are controlled such that the number of times of filtering by the wavelength division filtering mechanism on one or both sides on the frequency axis of the optical channel or the optical super channel becomes equal to or less than a predetermined value. As a result, since the number of times of filtering applied to the optical channels or the optical super channels is reduced and a loss due to the filtering is made smaller, the frequency utilization efficiency of optical signals is enhanced when the wavelength division multiplexing light is transmitted.

According to the optical network recited in the third aspect of the invention, a plurality of optical channels or optical super channels in a constant width on the frequency axis is collectively routed from the input optical fibers to the output optical fibers at the path-through node, and the filtering of an optical signal is permitted for the optical signal terminated at the path-through node, and one or more said constant widths are used in the optical network. As a result, since the number of times of filtering applied to the optical channels or the optical super channels is reduced and a loss due to the filtering is made smaller, the frequency utilization efficiency of optical signals is enhanced when the wavelength division multiplexing light is transmitted.

According to the optical network recited in the fourth aspect of the invention, since arrangements of plurality of frequency bands in said one or more constant widths used in the optical network are kept unique in the optical network, the control is made easy.

In the case of static design in which the optical network is designed by giving a traffic demand, the optical network recited in the fifth aspect of the invention is configured by searching for and assigning a route and a frequency arrangement of an optical channel or an optical super channel in the optical network such that the number of drop processes of adjacent optical channels at a predetermined node is minimized or becomes equal to or less than a predetermined value with respect to the optical channel or an optical super channel accommodated in an optical channel bundle or an optical super channel bundle having a constant width on the frequency axis. In the case of dynamic design in which an optical channel or an optical super channel is accommodated in the optical network each time the demand occurs, the optical network of the fifth aspect of the invention is configured by searching for and assigning a route or a frequency of a demanded optical channel such that the number of drop processes at a node is minimized or becomes equal to or less than a predetermined value with respect to the demanded optical channel or an optical super channel and existing adjacent optical channels or optical super channels when a route or a frequency is assigned to a newly arriving demand. As a result, since the number of times of filtering applied to the optical channels or the optical super channels is reduced and a loss due to the filtering is made smaller, the frequency utilization efficiency of optical signals is enhanced when the wavelength division multiplexing light is transmitted.

According to the optical network recited in the sixth aspect of the invention, a plurality of optical channels or optical super channels is collectively routed as a bundle with a constant width on the frequency axis from the input optical fibers to the output optical fibers at the path-through node located on the way, and the optical channels or the optical super channels are separately routed or switched in the frequency band without the set bundle. As a result, since the optical channels or optical super channels are separately routed or switched in a free band, the frequency utilization efficiency of optical signals is further enhanced when the wavelength division multiplexing light is transmitted.

MODE FOR CARRYING OUT THE INVENTION

An embodiment of the present invention will now be described in detail with reference to the drawings.

Embodiment

Figure 1:
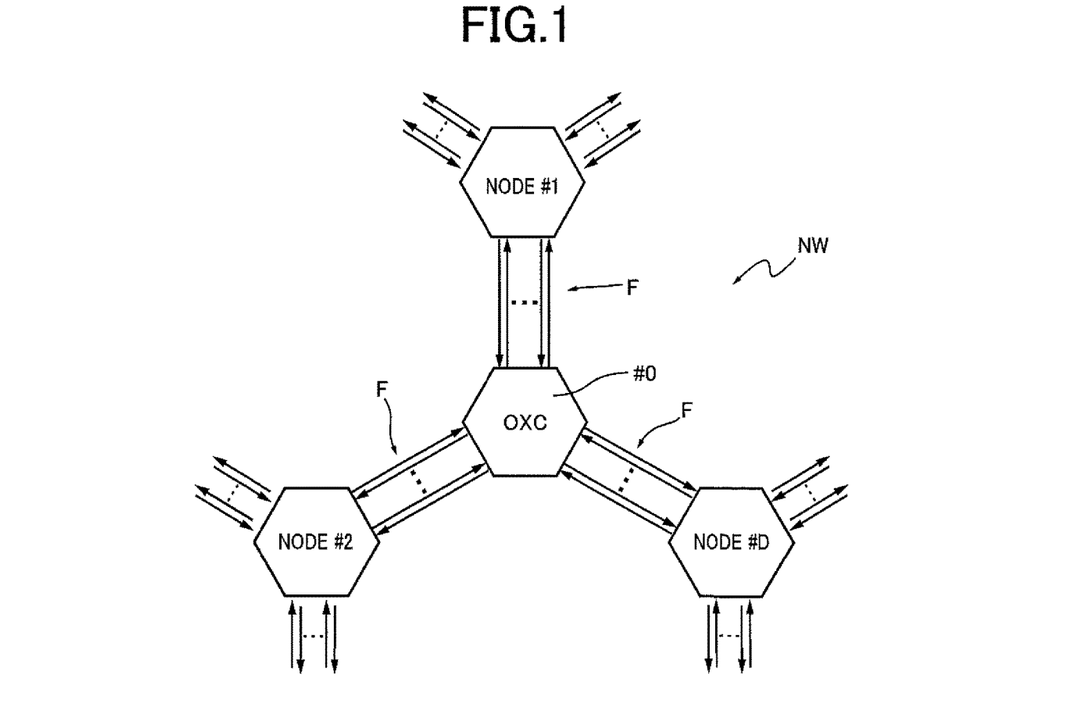
FIG. 1 is a conceptual diagram for explaining an optical network including an optical path cross-connect apparatus of an embodiment of the present invention.
Figure 2:
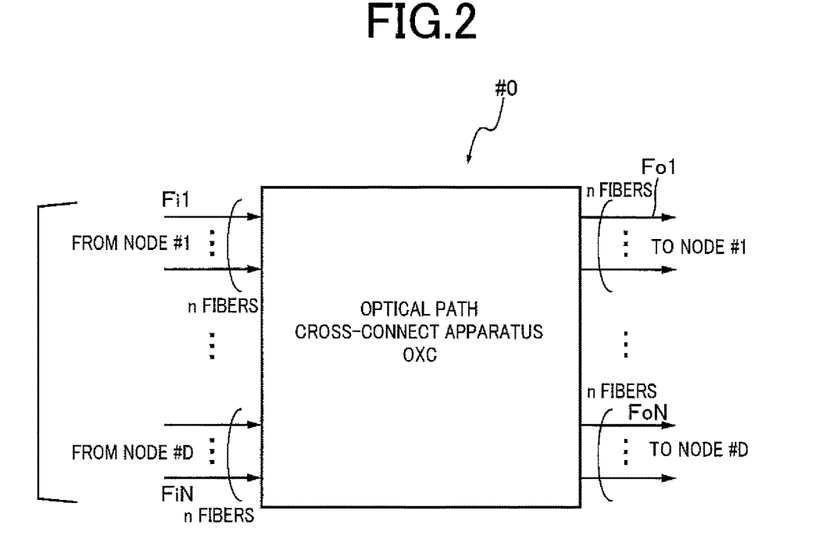
FIG. 2 is a diagram for explaining the function of the optical path cross-connect apparatus making up a node in the optical network of FIG. 1.

FIG. 1 illustrates a portion of an optical network NW composed of a plurality of nodes #0 to #D and output optical fibers F connecting therebetween and transmitting wavelength division multiplexing optical signals from a predetermined transmission node to a predetermined reception node. D is a positive integer indicative of the number of the nodes except the node #0. FIG. 2 shows input/output of an optical path cross-connect apparatus OXC making up the node #0. As shown in FIG. 2, the optical path cross-connect apparatus OXC is connected to a total of N input optical fibers Fi1 to FiN from the nodes #1 to #D adjacent to the node #0 and is connected to a total of N output optical fibers Fo1 to FoN to the nodes #1 to #D. Assuming that the input optical fibers Fi1 to FiN and the output optical fibers Fo1 to FoN are respectively bundled by n fibers, the N is represented by n×D. The number of the fibers between nodes may not be a constant number n and may be different for each node.

In this embodiment, one waveband WB is formed by multiplexed lights of L wavelengths respectively corresponding to optical channels (wavelength channels or light paths) corresponding to multiple wavelengths separated by, for example, 100 GHz in a predetermined communication wavelength band, and one wavelength division multiplexing (WDM) light is formed by multiplexing M wavebands WB and is transmitted through each of the optical fibers. Therefore, WB11 to WB1M, WB21 to WB2M, . . . WBK1 to WBKM are input in parallel through the input optical fibers Fi1, Fi2, . . . FiN, respectively, and the new routed wavebands WB11 to WB1M, WB21 to WB2M, . . . WBK1 to WBKM are output in parallel through the output optical fibers Fo1, Fo2, . . . FoN, respectively. The L, M, and N are integers and are set to L=4 to 8, M=8 to 10, and N=10 to 12, for example. The wavelength number m of each of the optical fibers is represented by L×M.

Figure 3:
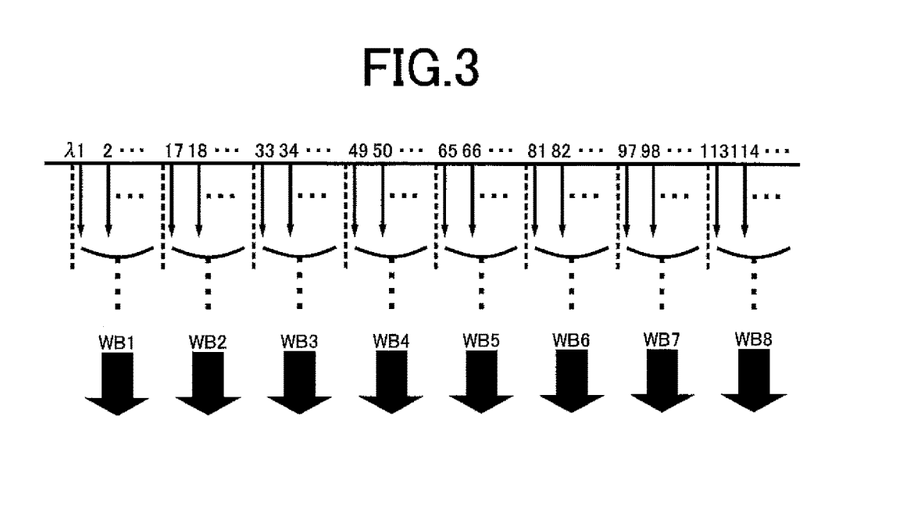
FIG. 3 is a diagram for explaining a configuration of a wavelength division multiplexing light transmitted through the optical network of FIG. 1 when made up of successively-arranged wavebands.

In this case, for example, the wavelengths of the wavelength channels included in the waveband WB11 are $\lambda 111$ to $\lambda 11L$; the wavelengths of the wavelength channels included in the waveband WB12 are $\lambda 121$ to $\lambda 12L$; the wavelengths of the wavelength channels included in the waveband WB1M are $\lambda 1M1$ to $\lambda 1ML$; the wavelengths of the wavelength channels included in the waveband WBKM are $\lambda KM1$ to $\lambda 1ML$; and these wavelengths, for example, $\lambda 121$ to $\lambda 12L$ are successively incremented in series on a frequency axis. FIG. 3 shows a configuration example of wavelengths $\lambda$ making up the wavebands, i.e., an example of successively-arranged wavebands, and multiple wavebands selected in series are set such that each band is made up of 16 wavelengths successive to each other selected out of successive wavelengths. In FIG. 3, the wavelength channels constituting the wavelength division multiplexing signals may be optical signals having the same bit rate as each other or may be optical signals having bit rates partially or entirely different from each other.

Figure 4:
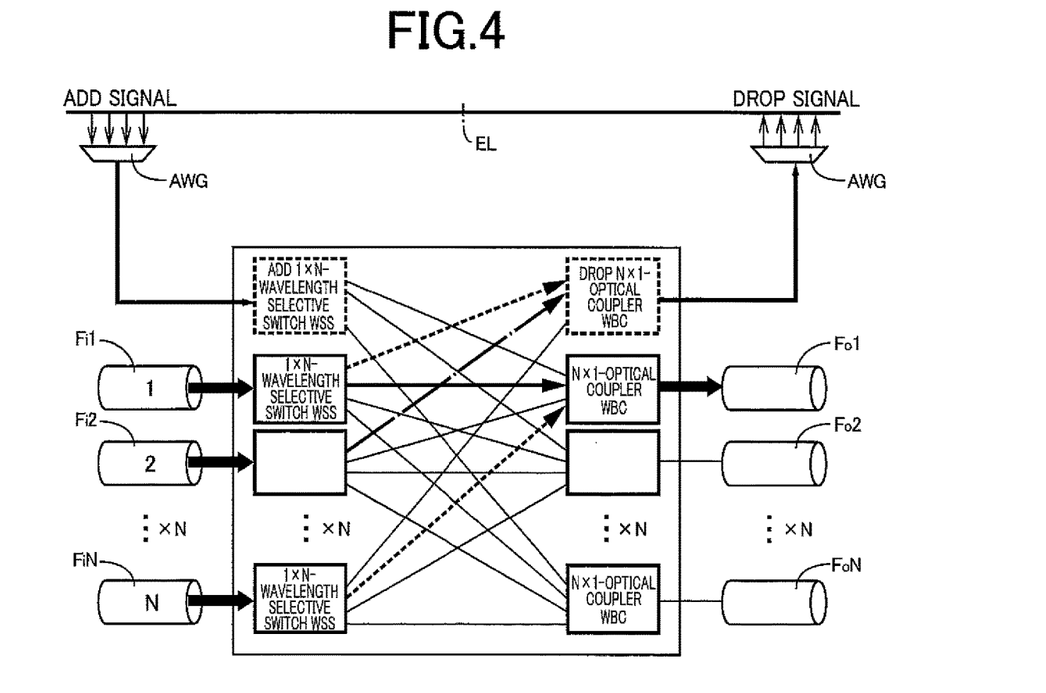
FIG. 4 is a diagram for explaining a configuration example of the optical path cross-connect apparatus making up a node in the optical network of FIG. 1.

The optical path cross-connect apparatus OXC is configured based on wavelength selective switches and, for example, as shown in FIG. 4, extracts, and switches a route of, a predetermined waveband or a predetermined wavelength included in one of wavelength division multiplexing lights input respectively through the N input optical fibers Fi1, Fi2, . . . FiN, so that the predetermined waveband or the predetermined wavelength is incorporated into another desired wavelength division multiplexing light and transmitted through a desired output optical fiber among the N output optical fibers Fo1, Fo2, . . . FoN. The optical path cross-connect apparatus OXC includes N 1×N-wavelength selective switches WS S respectively disposed for the N input optical fibers Fi1 to FiN and selecting a wavelength going to an arbitrary output optical fiber of the multiple (N) output optical fibers Fo1 to FoN from the wavebands making up the wavelength division multiplexing lights from the N input optical fibers Fi1 to FiN, and N N×1-optical couplers (waveband or wavelength couplers) WBC respectively disposed for the multiple (N) output optical fibers Fo1 to FoN and multiplexing and outputting the wavebands respectively output from the N 1×N-wavelength selective switches WS S to a desired output optical fiber to which the wavebands are directed among the multiple (N) output optical fibers Fo1 to FoN. These N×1-optical couplers WBC are configured in the same way as, and used in the direction opposite to, the 1×N-wavelength selective switches WSS, and are configured to have a symmetric structure providing the same function even when input and output are inverted. The optical cross-connect apparatus OXC is provided with an add 1×N-wavelength selective switch WSS for adding an add signal transmitted at a predetermined wavelength from a router of an electric layer EL to the wavelength division multiplexing light in a desired output optical fiber to which the add signal is directed among the N output optical fibers Fo1 to FoN. The optical cross-connect apparatus OXC is provided with a drop N×1-optical coupler WBC for dropping a drop signal of a predetermined wavelength included in the wavelength division multiplexing lights from the input optical fibers Fi1 to FiN to a desired router of the electric layer EL.

Figure 5:
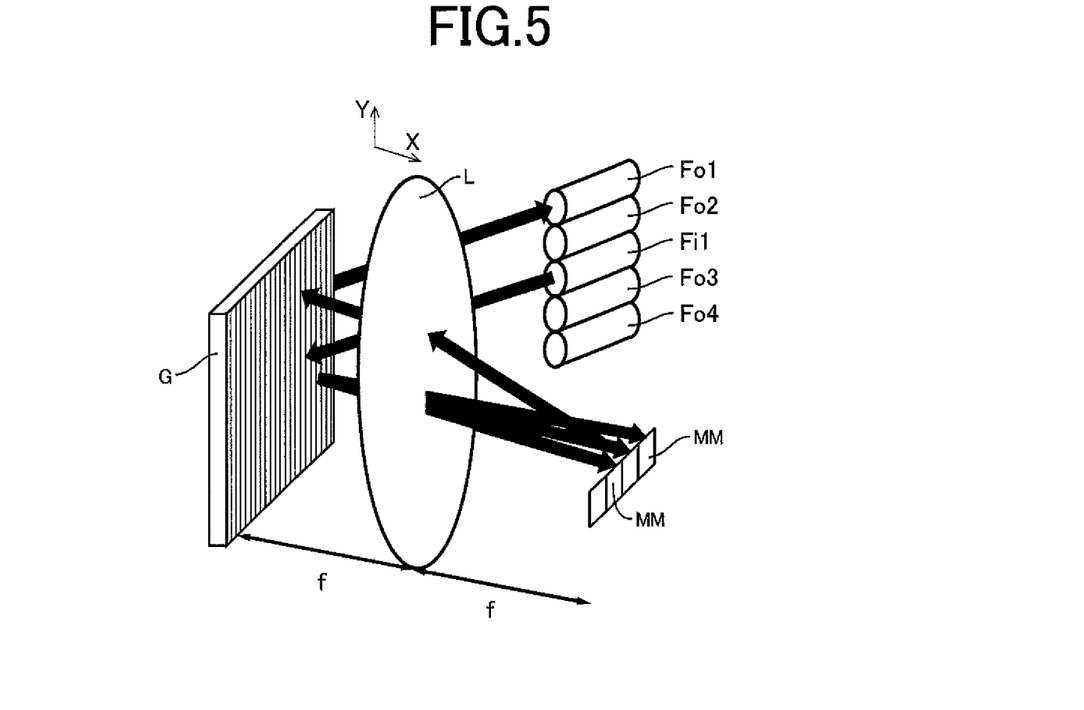
FIG. 5 is a diagram for explaining a three-dimensional MEMS optical switch that is a configuration example of a wavelength selective switch used in the optical path cross-connect apparatus of FIG. 4.
Figure 6:
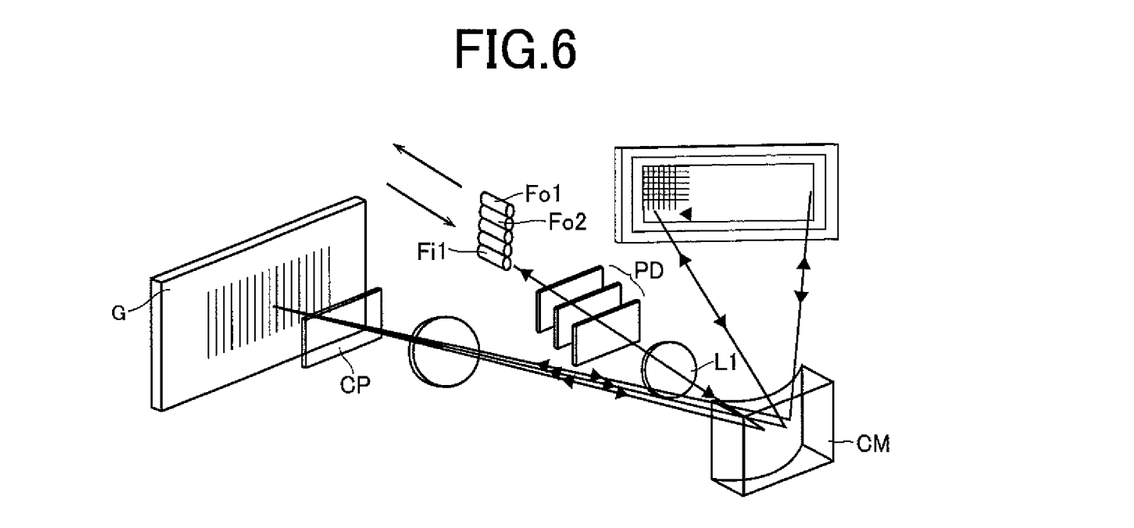
FIG. 6 is a diagram for explaining an LCOS optical switch that is a configuration example of a wavelength selective switch used in the optical path cross-connect apparatus of FIG. 4.

The 1×N-wavelength selective switches WSS each basically have multiple output ports for one input, i.e., N output ports as many as the number of fibers to the nodes #1 to #D adjacent to the node #0. The 1×N-wavelength selective switches WSS are each made up of a three-dimensional MEMS optical switch shown in FIG. 5 or an LCOS optical switch shown in FIG. 6, for example. As shown in FIG. 5, this three-dimensional MEMS optical switch includes a spectral diffraction grating G and a condenser lens L as well as m (four in FIG. 5) micromirrors MM as many as the number of wavelengths and an actuator (not shown) driving the micromirrors MM, and is driven such that the wavebands input from the input optical fiber Fi1 are dispersed by the spectral diffraction grating G on the basis of wavelengths and condensed by the condenser lens L onto the micromirrors MM and that a reflected light from the micromirrors MM is incident on an end surface of a desired output optical fiber FoN of the output optical fibers FoN (four fibers Fo1 to Fo4 in FIG. 5), so as to provide a wavelength selective switch function. As shown in FIG. 6, the LCOS optical switch includes a spectral diffraction grating G, condenser lenses L1, L2, a cylindrical mirror CM, an optical compensation plate CP, and polarizing plate PD, as well as a reflective liquid crystal plate LCOS having a multiplicity of mirrors electrically turned on/off on a silicon substrate, and a control circuit (not shown) driving the reflective liquid crystal plate LCOS, and is driven such that the wavebands input from the input optical fibers Fi are dispersed through the cylindrical mirror CM by the spectral diffraction grating G on the basis of wavelengths and condensed after going through the cylindrical mirror CM again by the reflective liquid crystal plate LCOS and that a reflected light selectively reflected from the reflective liquid crystal plate LCOS and going through the cylindrical mirror CM is incident on an end surface of a desired output optical fiber FoN of the output optical fibers FoN (four fibers Fo1 to Fo4 in FIG. 6), so as to provide a wavelength selective switch function.

Figure 7:
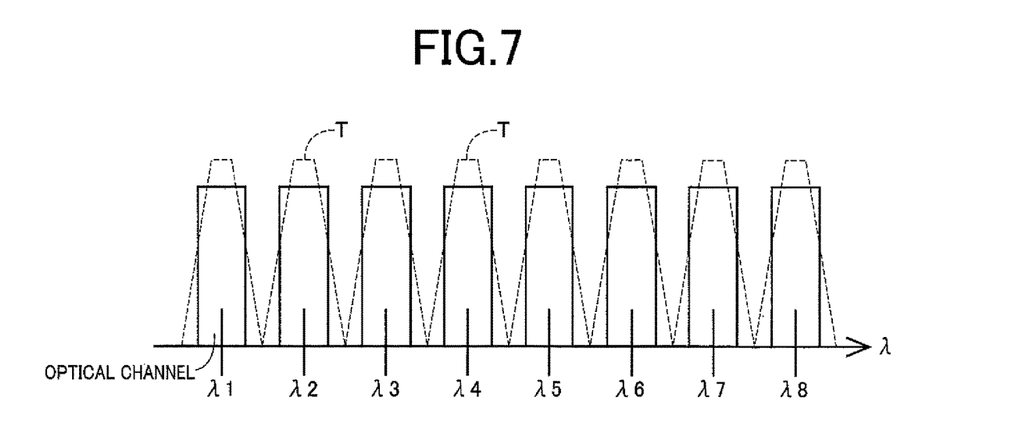
FIG. 7 is a diagram for explaining on a frequency axis an optical channel loss generated due to filtering when filtering characteristics in the optical path cross-connect apparatus of FIG. 4 are indicated by broken lines.
Figure 8:
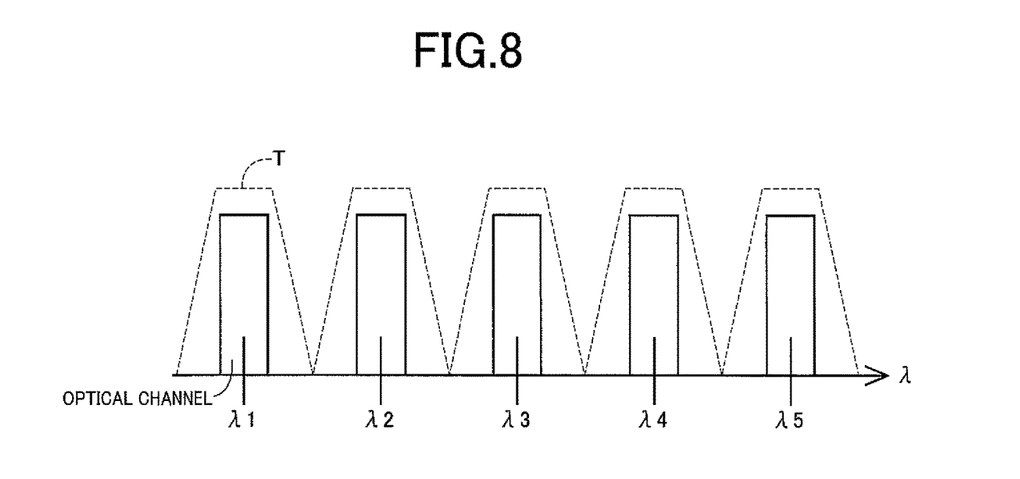
FIG. 8 is a diagram for explaining on a frequency axis a reduction in the number of optical channels when the filtering pass-band bandwidth indicated by the broken lines of FIG. 7 are expanded so as to cover rectangles indicative of a frequency width of the optical channels of the predetermined wavelength.

The 1×N-wavelength selective switches WSS each configured as described above perform filtering for extracting a desired wavelength by using the spectral diffraction grating G and very small mirrors, and optical characteristics T of this filtering have a trapezoidal shape centering on a predetermined selected wavelength on the frequency axis and inclined on both the left and right ends as indicated by broken lines of FIG. 7. Therefore, when an optical channel of a predetermined wavelength is selected by filtering at the time of routing or dropping, a rectangle indicative of the frequency width thereof partially falls outside the broken lines at shoulder portions and the optical channel suffers a loss due to cutting of the shoulder portions, and a signal intensity is further impaired as the optical channel is subjected to more filtering processes. Although the influence of filtering at the time of the dropping is only once at a terminating node in the optical network NW, the influence of multiple times of filtering applied at the times of the routing processes at the nodes is exerted at a higher rate. In this regard, the range of the broken lines showing the characteristics of the filtering may be expanded so as to cover a rectangular frame indicative of the frequency width of the optical channel of the predetermined wavelength as shown in FIG. 8; however, this leads to a reduction in the number of optical channels provided by wavelength division on the frequency axis, therefore resulting in a reduction in utilization efficiency of frequencies of optical communications performed in the optical network NW.

Figure 9:
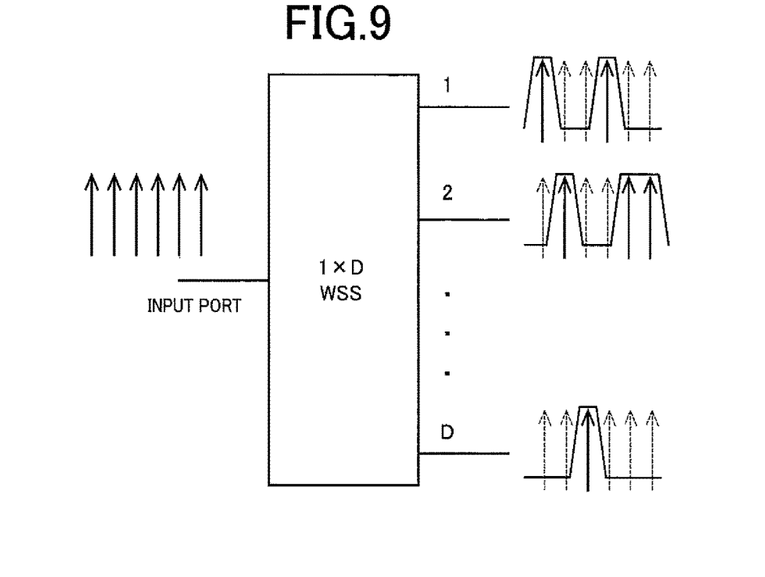
FIG. 9 is a diagram for explaining a principle of the filtering of FIG. 7 occurring in selection of an optical channel in the wavelength selective switch.

FIG. 9 is a diagram for explaining the influence of filtering in a 1×D-wavelength selective switch WSS during routing or in the 1×D-wavelength selective switch WSS acting as a D×1-dropping optical coupler WBC during dropping. In FIG. 9, an input wavelength division multiplexing optical signal is subjected to filtering through the 1λD-wavelength selective switch WSS, so that optical channels of desired wavelengths indicated by solid lines are extracted from desired output ports. In this case, although optical channels of wavelengths not desired indicated by broken line arrows are not selected due to the optical characteristics T of the filtering, the shoulder portions of the optical channels of desired wavelengths indicated by solid line arrows are each slightly cut at the same time due to the optical characteristics T of the filtering.

Figure 10:
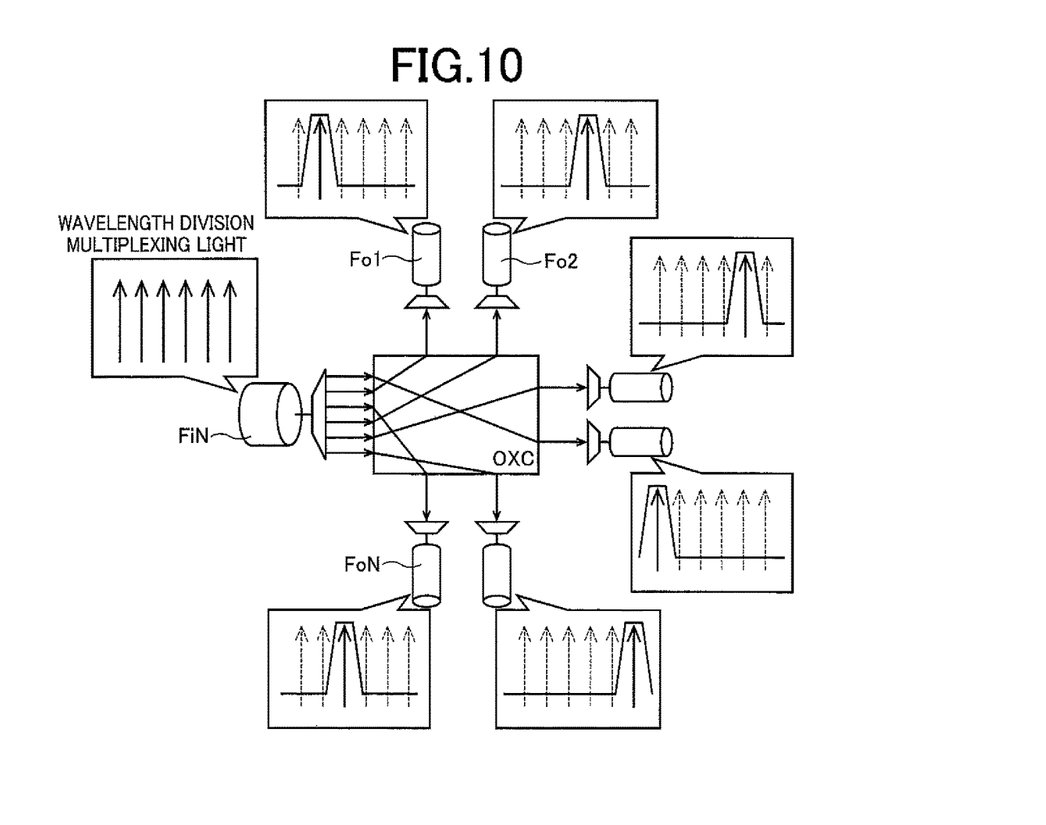
FIG. 10 is a diagram for explaining the filtering of FIG. 7 occurring in a routing process in the optical path cross-connect apparatus.

FIG. 10 is a diagram for explaining the influence of filtering during routing in the whole node, i.e., the whole of the optical path cross-connect apparatus OXC, passed through during routing. In FIG. 10, when desired optical channels included in the wavelength division multiplexing optical signal input to any of the input optical fibers FiN are respectively routed using the optical path cross-connect apparatus OXC to the output optical fibers Fo1 to FoN, the desired optical channels indicated by solid lines are selected based on wavelength through filtering in the wavelength selective switch WSS from the input wavelength division multiplexing optical signal. In this case, although optical channels of wavelengths not desired indicated by broken line arrows are not selected due to the optical characteristics T of the filtering, the shoulder portions of the optical channels of desired wavelengths indicated by solid line arrows are each slightly cut at the same time due to the filtering.

Figure 11:
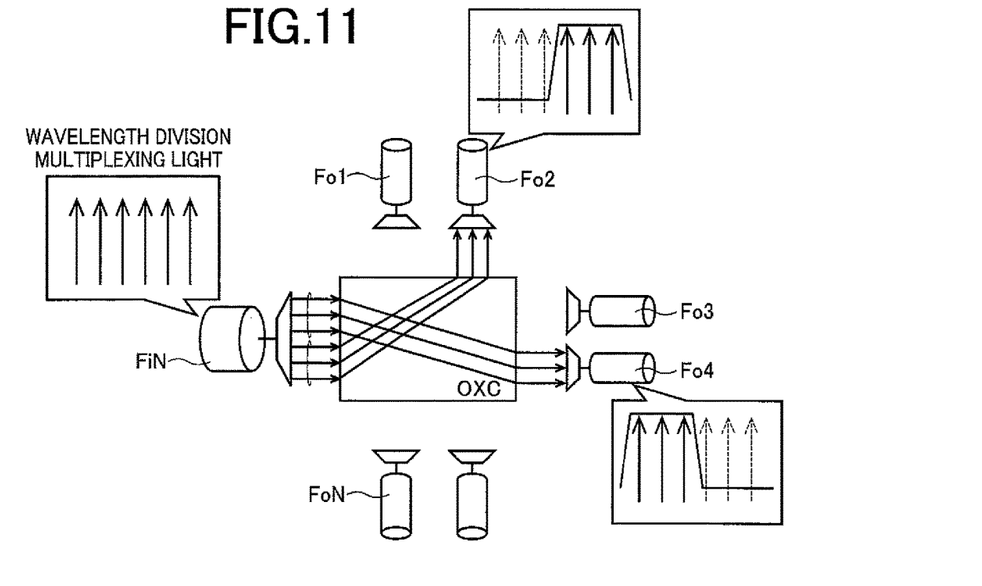
FIG. 11 is a diagram for explaining a system suppressing an optical signal impairment generated due to filtering in the routing process in the optical path cross-connect apparatus.

FIG. 11 is a diagram for explaining a control function of the optical network NW suppressing the influence of filtering applied from the optical path cross-connect apparatus OXC passed through during routing as far as possible. As shown in FIG. 11, the optical network NW has a function of suppressing the influence of filtering applied from the optical path cross-connect apparatus OXC passed through during routing as far as possible. In particular, when desired optical channels included in a wavelength division multiplexing optical signal input to any of the input optical fibers FiN are routed at a transmission node, a pass-through node, or a reception node to any of the output optical fibers Fo1 to FoN, the optical network NW allows a plurality of optical channels adjacent to each other on the frequency axis output to the same output optical fiber FoN as destination in any of the input optical fibers FiN to be routed together to the same destination output optical fiber FoN without being demultiplexed to respective optical channels. The multiple optical channels adjacent to each other on the frequency axis may form one or more sets, and the frequency band arrangements on the frequency axis are set to be kept unique (to constant frequency bands) in the optical network NW.

Figure 12:
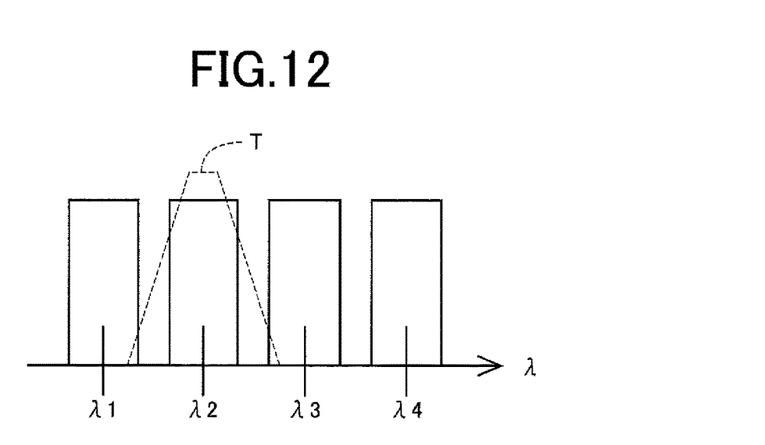
FIG. 12 is a diagram for explaining another filtering process, i.e., filtering for dropping an adjacent wavelength, having an effect of partially degrading adjacent optical channels.

FIG. 12 is a diagram for explaining another filtering process, i.e., filtering for dropping an adjacent wavelength, having an effect of partially cut an optical channel. As shown in FIG. 12, when optical channels arranged on the frequency axis are comparatively densely arranged and an optical channel of a drop wavelength $\lambda 2$ is selected by the optical characteristics T of filtering at a predetermined node, optical channels of wavelengths $\lambda 1$ and $\lambda 3$ adjacent to the optical channel of the drop wavelength $\lambda 2$ are partially cut by the tail of the optical characteristics T. With regard to the influence of filtering due to dropping of an adjacent wavelength resulting in cut of portions of the optical channels of wavelengths $\lambda 1$ and $\lambda 3$ due to dropping of the optical channel of the adjacent wavelength $\lambda 2$ adjacent to the optical channels of wavelengths $\lambda 1$ and $\lambda 3$ as described above, the influence may occur in each of the nodes of the optical network NW.

Figure 13:
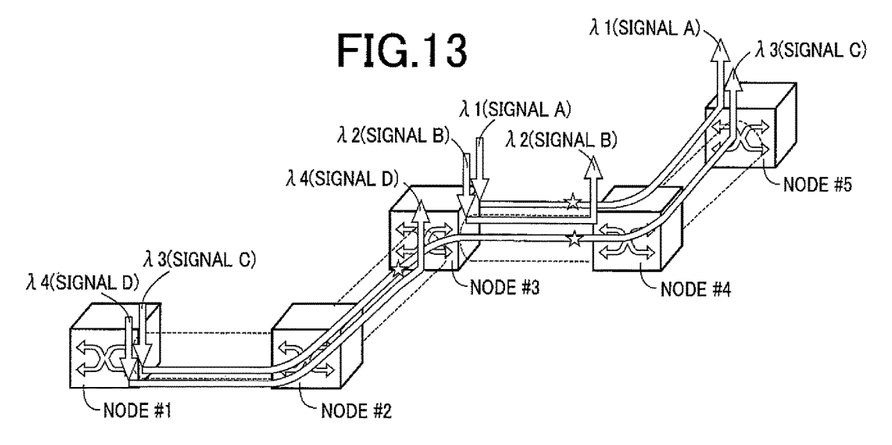
FIG. 13 is a diagram for explaining an optical signal impairment occurring when a wavelength division multiplexing signal is transmitted in an optical network composed of five nodes. Stars in the figure represent the occurrence of the optical signal impairment.

FIG. 13 is a diagram for explaining occurrence of such influence of filtering due to dropping of an optical channel of an adjacent wavelength in the case of transmitting the optical channel of the wavelength $\lambda 1$, the optical channel of the wavelength $\lambda 2$, the optical channel of the wavelength $\lambda 3$, and the optical channel of the wavelength $\lambda 4$ shown in FIG. 12 as a bundle (a band) in the optical network NW connecting a node #1, a node #2, a node #3, a node #4, and a node #5, for example. In FIG. 13, a signal C of the optical channel of the wavelength $\lambda 3$ and a signal D of the optical channel of the wavelength $\lambda 4$ are added from the node #1; a signal A of the optical channel of the wavelength $\lambda 1$ and a signal B of the optical channel of the wavelength $\lambda 2$ are added from the node #3; the signal D of the optical channel of the wavelength $\lambda 4$ is dropped from the node #3; the signal B of the optical channel of the wavelength $\lambda 2$ is dropped from the node #4; and the signal A of the optical channel of the wavelength $\lambda 1$ and the signal C of the optical channel of the wavelength $\lambda 3$ are dropped from the node #5. In this case, the optical channel of the wavelength $\lambda 3$ adjacent to the optical channel of the wavelength $\lambda 4$ is partially degraded at the node #3 due to the filtering process of dropping the optical channel of the wavelength $\lambda 4$. Additionally, the optical channel of the wavelength λ1 and the optical channel of the wavelength λ3 adjacent to the optical channel of the wavelength λ2 are both partially degraded at the node #4 due to the filtering process of dropping the optical channel of the wavelength λ2. Stars of FIG. 13 indicate that the optical channels are partially degraded.

Figure 14:
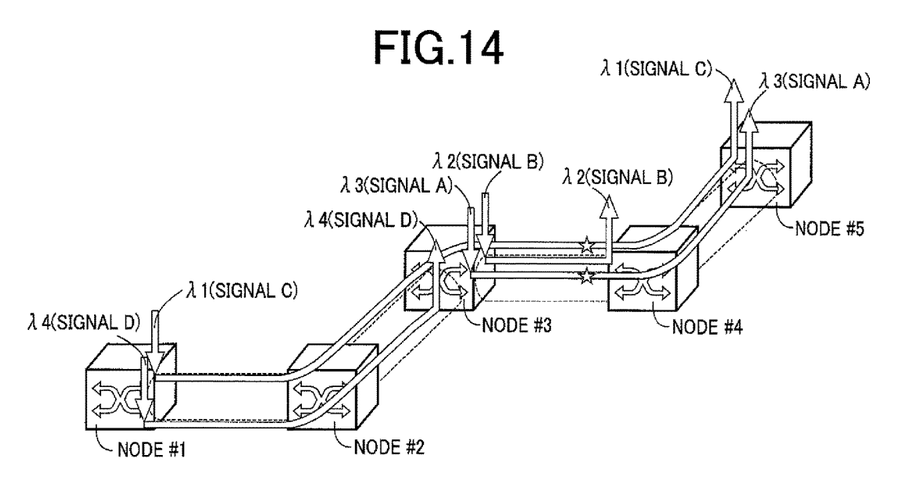
FIG. 14 is a diagram for explaining a transmission system reducing an influence of filtering due to dropping of an adjacent wavelength in the optical network composed of five nodes. Stars in the figure represent the occurrence of the optical signal impairment. A reduction in the number of stars is shown as compared to FIG. 13.

FIG. 14 is a diagram for explaining the optical network NW reducing the influence of filtering due to dropping of an optical channel of an adjacent wavelength in the case of respectively transmitting the signal A, the signal B, the signal C, and the signal D through the optical channel of the wavelength λ1, the optical channel of the wavelength λ2, the optical channel of the wavelength λ3, and the optical channel of the wavelength λ4 shown in FIG. 12 in the optical network NW shown in FIG. 13. In the optical network NW of FIG. 14, by utilizing the fact that no restriction is placed on which signal is assigned to which wavelength channel inside a bundle when a plurality of wavelength channels is routed as a bundle, the assignment is performed to reduce the influence of filtering due to dropping of an optical channel of an adjacent wavelength. In particular, the signal A transmitted by using the optical channel of the wavelength λ1 and the signal C transmitted by using the optical channel of the wavelength λ3 in FIG. 13 are interchanged with each other in the assignment of respective wavelength channels (carrier wavelengths) in FIG. 14. In other words, the signal A transmitted by using the optical channel of the wavelength λ1 in FIG. 13 is transmitted by using the optical channel of the wavelength λ3 in FIG. 14 from the node #3 to the node #5, and the signal C transmitted by using the optical channel of the wavelength λ3 in FIG. 13 is transmitted by using the optical channel of the wavelength λ1 in FIG. 14 from the node #1 to the node #5. At the node #4 of the optical network NW shown in FIG. 14, the optical channel of the wavelength λ1 and the optical channel of the wavelength λ3 adjacent to the optical channel of the wavelength λ2 are both partially degraded due to the filtering process of dropping the optical channel of the wavelength λ2, and points of the degradation of the optical channels indicated by stars are reduced as compared to the optical network NW of FIG. 13.

Figure 15:
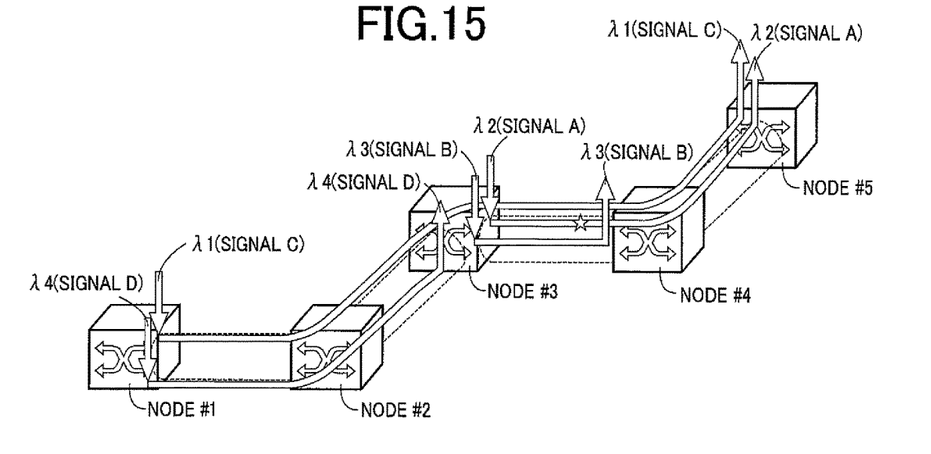
FIG. 15 is a diagram for explaining another transmission system reducing an influence of filtering due to dropping of an adjacent wavelength in the optical network composed of five nodes.

In the optical network NW shown in FIG. 15, as is the case with the optical networks NW shown in FIGS. 13 and 14, in the case of respectively transmitting the signal A, the signal B, the signal C, and the signal D through the optical channel of the wavelength λ1, the optical channel of the wavelength λ2, the optical channel of the wavelength λ3, and the optical channel of the wavelength λ4 shown in FIG. 12, the assignment is performed to reduce the influence of filtering due to dropping of an optical channel of an adjacent wavelength by utilizing the fact that no restriction is placed on which signal is assigned to which wavelength channel inside a bundle when a plurality of wavelength channels is routed as a bundle, so as to reduce the influence of filtering due to dropping of an optical channel of an adjacent wavelength. In particular, the signal A transmitted by using the optical channel of the wavelength λ1 in FIG. 13 is transmitted by using the optical channel of the wavelength λ2 in FIG. 15 from the node #3 to the node #5; the signal B transmitted by using the optical channel of the wavelength λ2 in FIG. 13 is transmitted by using the optical channel of the wavelength λ3 in FIG. 15 from the node #3 to the node #4; and the signal C transmitted by using the optical channel of the wavelength λ3 in FIG. 13 is transmitted by using the optical channel of the wavelength λ1 in FIG. 15 from the node #1 to the node #5. At the node #4 of the optical network NW shown in FIG. 15, the optical channel of the wavelength λ2 adjacent to the optical channel of the wavelength λ3 is partially degraded due to the filtering process of dropping the optical channel of the wavelength λ3, and the points of the degradation of the optical channels indicated by stars are reduced as compared to the optical networks NW of FIGS. 13 and 14.

Figure 16:
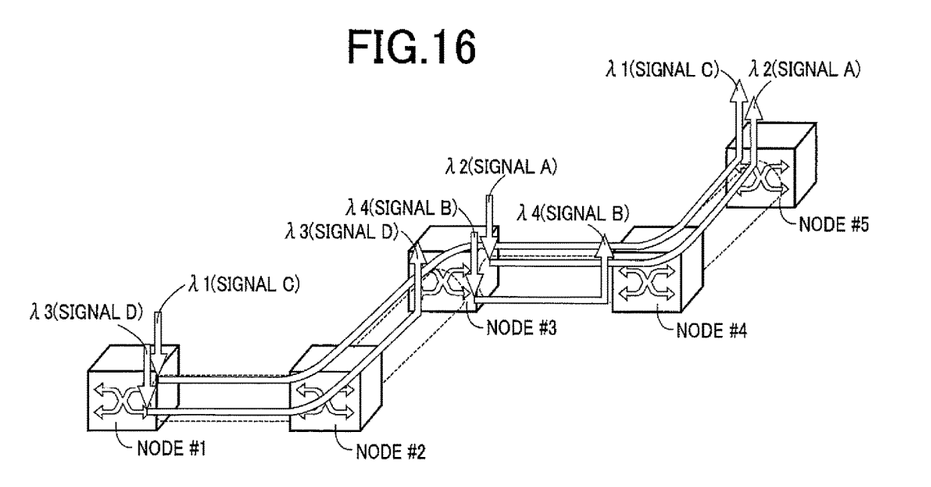
FIG. 16 is a diagram for explaining still another transmission system deleting an influence of filtering due to dropping of an adjacent wavelength in the optical network composed of five nodes.

In the optical network NW shown in FIG. 16, as is the case with the optical networks NW shown in FIGS. 13, 14, and 15, in the case of respectively transmitting the signal A, the signal B, the signal C, and the signal D through the optical channel of the wavelength λ1, the optical channel of the wavelength λ2, the optical channel of the wavelength λ3, and the optical channel of the wavelength λ4 shown in FIG. 12, the assignment is performed to reduce the influence of filtering due to dropping of an optical channel of an adjacent wavelength by utilizing the fact that no restriction is placed on which signal is assigned to which wavelength channel inside a bundle when a plurality of wavelength channels is routed as a bundle, so as to reduce the influence of filtering due to dropping of an optical channel of an adjacent wavelength. In particular, the signal A transmitted by using the optical channel of the wavelength λ1 in FIG. 13 is transmitted by using the optical channel of the wavelength λ2 in FIG. 16 from the node #3 to the node #5; the signal B transmitted by using the optical channel of the wavelength λ2 in FIG. 13 is transmitted by using the optical channel of the wavelength λ4 in FIG. 16 from the node #3 to the node #4; the signal C transmitted by using the optical channel of the wavelength λ3 in FIG. 13 is transmitted by using the optical channel of the wavelength λ1 in FIG. 16 from the node #1 to the node #5; and the signal D transmitted by using the optical channel of the wavelength λ4 in FIG. 13 is transmitted by using the optical channel of the wavelength λ3 in FIG. 16 from the node #1 to the node #3. At all the nodes #1 to #5 of the optical network NW shown in FIG. 16, an optical channel of a wavelength adjacent to an optical channel of a predetermined wavelength is no longer partially degraded due to the filtering process of dropping the optical channel of the predetermined wavelength.

As described above, the optical network NW of this embodiment has not only the function of suppressing the influence of filtering applied from the optical path cross-connect apparatus OXC passed through during routing as far as possible but also the control function of suppressing the influence of filtering due to dropping of an optical channel of an adjacent wavelength as far as possible. In particular, when desired optical channels included in a wavelength division multiplexing optical signal input to any of the input optical fibers FiN are routed at a transmission node, a pass-through node, or a reception node to any of the output optical fibers Fo1 to FoN, the optical network NW of this embodiment allows a plurality of optical channels adjacent to each other on the frequency axis output and having the same output optical fiber FoN as destination in any of the input optical fibers FiN to be routed together to the same destination output optical fiber FoN without being demultiplexed to respective optical channels. The multiple optical channels adjacent to each other on the frequency axis may form one or more sets, and the frequency band arrangement on the frequency axis is set to be kept unique (to constant frequency bands) in the optical network NW. At the time of the routing, this optical network NW permits filtering of an optical signal for dropping at a reception node only for the optical channel to be dropped at the reception node, and controls routing paths and frequency arrangements of the optical channel and optical channels terminated at paththrough nodes located on the way such that the number of times of filtering by a wavelength division filtering mechanism on one or both sides on the frequency axis of the optical channel becomes equal to or less than a predetermined value.

In the case of static design in which the optical network NW is designed by giving a traffic demand in advance, the optical network NW is configured by searching for and assigning a route and a frequency arrangement of an optical channel in the optical network NW such that the number of drop processes of adjacent optical channels at a predetermined node is minimized or becomes equal to or less than a predetermined value with respect to the optical channel accommodated in an optical channel bundle having a constant width on the frequency axis. In the case of dynamic design in which an optical channel is accommodated in the optical network NW each time the demand occurs, the optical network NW is configured by searching for and assigning a route or a frequency of a demanded optical channel such that the number of drop processes at a node is minimized or becomes equal to or less than a predetermined value with respect to the demanded optical channel and existing adjacent optical channels when a route or a frequency is assigned to a newly arriving demand.

The optical network NW is configured such that a plurality of optical channels in a constant width on the frequency axis is collectively routed from an input optical fiber to an output optical fiber at a path-through node, that filtering of an optical signal is permitted for the optical signal terminated at the path-through node, and that one or more constant widths are used in the optical network NW. Arrangements of plurality of frequency bands in the one or more constant widths are kept unique in the optical network NW.

Figure 17:
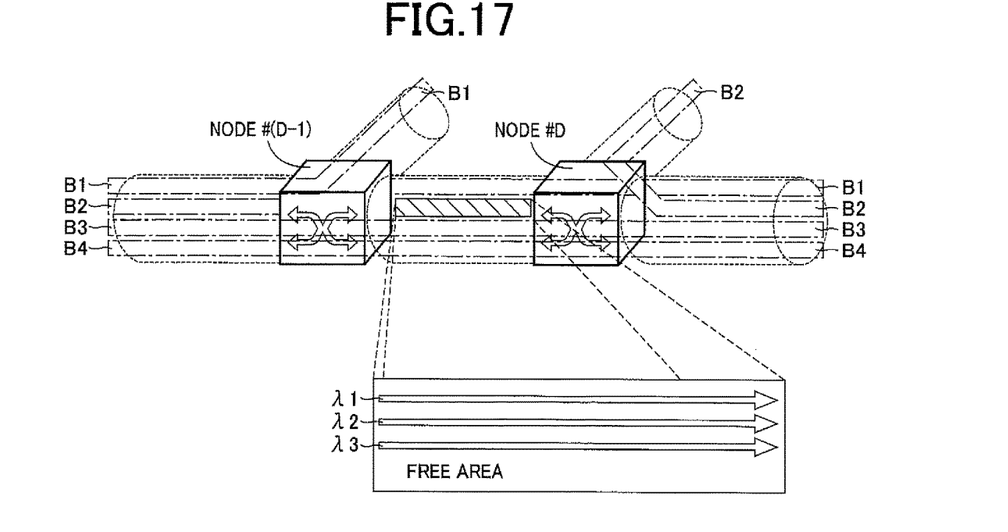
FIG. 17 is a diagram for explaining a system further enhancing utilization efficiency by utilizing a free band between nodes generated when filtering is suppressed.

The optical network NW is configured to provide control such that a plurality of optical channels is collectively routed as a bundle with a constant width on the frequency axis from the input optical fibers Fi1 to FiN to the output optical fibers Fo1 to FoN at a path-through node located on the way, that a transmission frequency band in which the bundle is not set is detected between predetermined nodes, for example, a node #(D−1) and a node #D, and that optical channels are separately routed in the transmission frequency band between the node #(D−1) and the node #D. FIG. 17 is a schematic of a portion of the optical network NW including the node #(D−1) and the node #D on an enlarged scale. In FIG. 17, under the situation where a plurality of bundles B1, B2, B3, and B4 is routed including, for example, a bundle (a group) of the optical channel of the wavelength $\lambda 1$, the optical channel of the wavelength $\lambda 2$, the optical channel of the wavelength $\lambda 3$, and the optical channel of the wavelength $\lambda 4$ shown in FIG. 12 under the control of the optical network NW, when a free band without the bundle 13 established is generated between the node #(D−1) and the node #D, routing of optical channels on the basis of wavelengths is permitted in the free band.

As described above, according to the optical network NW of this embodiment, when optical channels input from any of the input optical fibers Fi1 to FiN are routed or switched to one or more output optical fibers Fo1 to FoN in at least one of the optical path cross-connect apparatus OXC passed through by a wavelength division multiplexing optical signal transmitted from a predetermined transmission node to the predetermined reception node, a plurality of optical channels adjacent to each other on the frequency axis output to the same output optical fiber FoN in the input optical fibers Fi1 to FiN is collectively demultiplexed as a bundle without being demultiplexed for respective optical channels and is routed or switched to the output optical fiber. As a result, since the number of times of filtering applied to the optical channels is reduced and a loss due to the filtering is made smaller, the frequency utilization efficiency of optical signals is enhanced when the wavelength division multiplexing light is transmitted.

According to the optical network NW of this embodiment, when one of the optical channels is routed or switched from the transmission node through a plurality of nodes to the reception node, and a plurality of optical channels adjacent to each other on the frequency axis including an optical channel output to the same output optical fiber FoN in the input optical fibers Fi1 to FiN or dropped at the reception node is collectively demultiplexed without being demultiplexed for respective optical channels and is routed or switched to the output optical fiber FoN, the filtering of the optical signal for dropping is permitted only for the optical channel to be dropped at the reception node, and the routing paths and frequency arrangements of the optical channel and optical channels terminated at the path-through nodes located on the way are controlled such that the number of times of filtering by the wavelength division filter mechanism on one or both sides on the frequency axis of the optical channel becomes equal to or less than a predetermined value. As a result, since the number of times of filtering applied to the optical channels is reduced and a loss due to the filtering is made smaller, the frequency utilization efficiency of optical signals is enhanced when the wavelength division multiplexing light is transmitted.

According to the optical network NW of this embodiment, a plurality of optical channels in a constant width on the frequency axis is collectively routed from the input optical fibers Fi1 to FiN to the output optical fibers Fo1 to FoN at a path-through node, and the filtering of an optical signal is permitted for the optical signal terminated at the path-through node, and one or more the constant widths are used in the optical network NW. As a result, since the number of times of filtering applied to the optical channels is reduced and a loss due to the filtering is made smaller, the frequency utilization efficiency of optical signals is enhanced when the wavelength division multiplexing light is transmitted.

According to the optical network NW of this embodiment, since arrangements of plurality of frequency bands in the one or more constant widths used in the optical network NW are kept unique in the optical network NW, the control is made easy.

In the case of static design in which the optical network is designed by giving a traffic demand, the optical network NW of this embodiment is configured by searching for and assigning a route and a frequency arrangement of an optical channel in the optical network NW such that the number of drop processes of adjacent optical channels at a predetermined node is minimized or becomes equal to or less than a predetermined value with respect to the optical channel or an optical super channel accommodated in an optical channel bundle having a constant width on the frequency axis. In the case of dynamic design in which an optical channel is accommodated in the optical network NW each time the demand occurs, the optical network NW of this embodiment is configured by searching for and assigning a route and a frequency of a demanded optical channel such that the number of drop processes at a node is minimized or becomes equal to or less than a predetermined value with respect to the demanded optical channel or an optical super channel and existing adjacent optical channels or optical super channels when a route or a frequency is assigned to a newly arriving demand. As a result, since the number of times of filtering applied to the optical channels is reduced and a loss due to the filtering is made smaller, the frequency utilization efficiency of optical signals is enhanced when the wavelength division multiplexing light is transmitted.

According to the optical network NW of this embodiment, a plurality of optical channels is collectively routed as a bundle with a constant width on the frequency axis from the input optical fibers Fi1 to FiN to the output optical fibers Fo1 to FoN at a path-through node located on the way, and the optical channels are separately routed or switched in the frequency band between the nodes without the set bundle. As a result, since the optical channels or optical super channels are separately routed or switched in a free band, the frequency utilization efficiency of optical signals is further enhanced when the wavelength division multiplexing light is transmitted.

Although the embodiment of the present invention has been described with reference to the drawings, the present invention is applicable in other forms.

Figure 18:
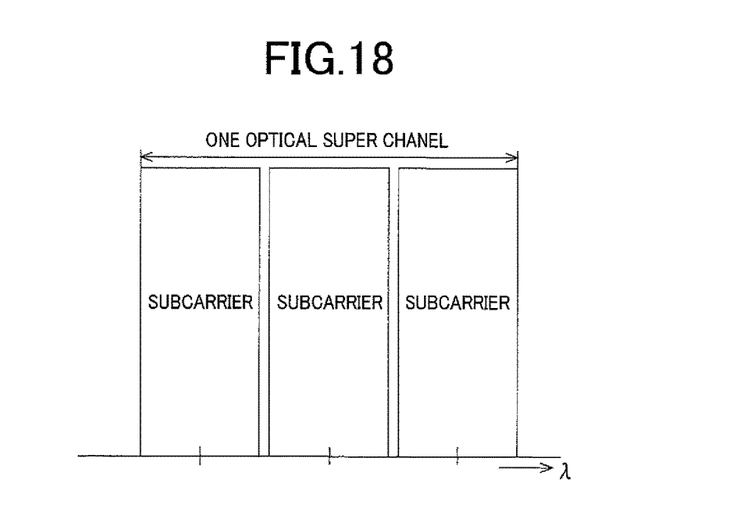
FIG. 18 is a diagram for explaining a configuration of an optical super channel.

For example, although an optical channel is used as a unit of optical signals selected from the wavelength division multiplexed optical signal and the control is provided so that the optical channel is not affected by the filtering process in the optical network NW of the embodiment, an optical super channel shown in FIG. 18 may be used instead of the optical channel. This optical super channel is a channel constructed from signals of a predetermined bit rate by using a plurality of optical subcarriers so as to generate a large-capacity signal and is handled as one minimum unit optical signal. Therefore, the optical super channel is handled as a unit from a transmission node to a reception node, instead of a group of multiple different optical signals, without being divided at a node located on the way in the optical network NW so as to avoid filtering of a subcarrier making up a portion of the optical super channel.

Although the term "routing" in the embodiment described above means that an optical channel (wavelength path) included in a wavelength division multiplexing optical signal input to a node is selected based on wavelength and output so that the optical channel is carried through an output optical fiber toward the destination reception node indicated by a wavelength label of the optical channel, the term "switching" may be used in the same sense. The phrase "on the frequency axis" used in the case of representing the correlation of frequency between optical channels is used in the same sense as "on the wavelength axis."

In the embodiment, the optical path cross-connect apparatus OXC may be replaced with a ROADM (Reconfigurable Optical Add/Drop Multiplexer) optical switch capable of selecting an optical channel of a desired wavelength from the wavelength division multiplexing optical signal or capable of combining an optical channel of a desired wavelength with the wavelength division multiplexing light on a desired route. In short, a ROADM apparatus may be used instead of, or in addition to, the optical path cross-connect apparatus OXC.

Although the optical channel of the drop wavelength is demultiplexed and dropped to the electric layer EL through filtering by the optical couplers WBC (wavelength selective switches WSS) in the optical path cross-connect apparatus OXC in the embodiment as shown in FIG. 4, the optical channel of the drop wavelength may be demultiplexed and dropped to the electric layer EL through filtering by the wavelength selective switches WSS disposed on the input optical fibers Fi1 to FiN.

The optical path cross-connect apparatus OXC of the embodiment may be subjected to various modifications such as disposing a waveband selective switch between the wavelength selective switches WSS and the optical couplers WBC and disposing an optical cross-connect portion (subsystem) for expansion as needed.

Although not exemplarily illustrated one by one, the present invention may variously be modified without departing from the spirit thereof.

REFERENCE SIGNS LIST

NW: Optical network
0 to #D: Node
OXC: Optical path cross-connect apparatus
WSS: Wavelength selective switch
Fi1 to FiN: Input optical fiber
Fo1 to FoN: Output optical fiber

The invention claimed is:

1. An optical network transmitting a wavelength division multiplexing optical signal from a predetermined transmission node to a predetermined reception node via one or more reconfigurable optical add/drop multiplexer and/or optical path cross-connect apparatuses, wherein
when optical channels or optical super channels made up of successive optical subcarriers input from any of input optical fibers are routed or switched to one or more output optical fibers in at least one of the reconfigurable optical add/drop multiplexer and/or the optical path cross-connect apparatus passed through by a wavelength division multiplexing optical signal transmitted from the predetermined transmission node to the predetermined reception node, a plurality of optical channels or optical super channels adjacent to each other on a frequency axis output to the same output optical fiber in each input optical fiber is collectively demultiplexed without being demultiplexed for respective optical channels or optical super channels and is routed or switched to the output optical fiber, and wherein
routing paths and frequency arrangements of an optical channel or an optical super channel as well as the optical channels or the optical super channels terminated at path-through nodes located on the way are controlled such that a number of times of filtering by a wavelength division filtering mechanism on one or both sides on the frequency axis of the optical channel or the optical super channel becomes equal to or less than a predetermined value.

2. The optical network according to claim 1, wherein
when any one of the optical channels or the optical super channels is routed or switched from the transmission node through a plurality of nodes to the reception node, and the plurality of optical channels or optical super channels adjacent to each other on the frequency axis including an optical channel output to the same output optical fiber in each input optical fiber or dropped at the reception node is collectively demultiplexed without being demultiplexed for respective optical channels or optical super channels and is routed or switched to the output optical fiber, filtering of an optical signal for dropping is permitted only for the optical channel or the optical super channel to be dropped at the reception node.

3. The optical network according to claim 1, wherein
the plurality of optical channels or optical super channels in a constant width on the frequency axis is collectively routed from the input optical fibers to the output optical fibers at the path-through node, wherein filtering of an optical signal is permitted for the optical signal terminated at the path-through node, and wherein one or more said constant widths are used in the optical network.

4. The optical network according to claim 3, wherein arrangements of plurality of frequency bands in said one or more constant widths used in the optical network are kept unique in the optical network.

5. The optical network according to claim 3, wherein in a case of static design in which the optical network is designed by giving a traffic demand, a route and a frequency arrangement of an optical channel or an optical super channel in the optical network are searched for and assigned such that a number of drop processes of adjacent optical channels at a predetermined node is minimized or becomes equal to or less than a predetermined value with respect to the optical channel or the optical super channel accommodated in a bundle of optical channels or optical super channels having a constant width on the frequency axis.

6. The optical network according to claim 1, wherein the plurality of optical channels or optical super channels is collectively routed as a bundle with a constant width on the frequency axis from input optical fibers to output optical fibers at a path-through node located on the way, and wherein the optical channels or the optical super channels are separately routed or switched in a frequency band in which the bundle is not set.

7. The optical network according to claim 3, wherein in a case of dynamic design in which the optical channel or the optical super channel is accommodated in the optical network each time a demand occurs, a route or a frequency of a demanded optical channel is searched for and assigned such that a number of drop processes at a node is minimized or becomes equal to or less than a predetermined value with respect to the demanded optical channel or optical super channel as well as existing adjacent optical channels or optical super channels when a route or a frequency is assigned to a newly arriving demand.

* * * * *